(12) United States Patent
Van Mil et al.

(10) Patent No.: US 7,969,626 B2
(45) Date of Patent: Jun. 28, 2011

(54) SCANNER AND METHOD OF SCANNING

(75) Inventors: Cornelis Bartholomeus Maria Van Mil, Reuver (NL); Jacobus Hubertus Theodoor Jamar, Vessem (NL); Robertus Johannes Adam Gorter, Utrecht (NL)

(73) Assignee: Oce-Technologies B.V., Venlo (NL)

( * ) Notice: Subject to any disclaimer, the term of this patent is extended or adjusted under 35 U.S.C. 154(b) by 137 days.

(21) Appl. No.: 12/153,863

(22) Filed: May 27, 2008

(65) Prior Publication Data

US 2008/0247008 A1     Oct. 9, 2008

Related U.S. Application Data

(63) Continuation of application No. PCT/EP2005/012882, filed on Nov. 29, 2005.

(51) Int. Cl.
*H04N 1/46* (2006.01)
*G06K 9/00* (2006.01)

(52) U.S. Cl. .......................... 358/505; 358/512; 382/162

(58) Field of Classification Search .................. 358/505, 358/509, 512, 514, 516, 518, 520, 521, 474, 358/484, 462, 475, 1.13, 540, 539, 530, 504; 382/163, 167, 165, 318
See application file for complete search history.

(56) References Cited

U.S. PATENT DOCUMENTS

| | | | | |
|---|---|---|---|---|
| 5,335,082 A * | 8/1994 | Sable | ............................ | 347/232 |
| 5,398,117 A * | 3/1995 | Suzuki et al. | ................. | 358/451 |
| 5,555,107 A * | 9/1996 | Funada et al. | ................. | 358/518 |
| 5,602,655 A * | 2/1997 | Arakawa et al. | .............. | 358/501 |
| 5,721,628 A * | 2/1998 | Takaragi et al. | .............. | 358/518 |
| 5,923,447 A | 7/1999 | Yamada et al. | | |
| 5,943,463 A * | 8/1999 | Unuma et al. | ................. | 385/119 |
| 5,973,802 A | 10/1999 | Hirota et al. | | |
| 6,023,526 A * | 2/2000 | Kondo et al. | ................. | 382/165 |
| 6,069,716 A * | 5/2000 | Yamamoto | ..................... | 358/518 |
| 6,198,553 B1 * | 3/2001 | Yamamoto et al. | .......... | 358/520 |
| RE37,282 E * | 7/2001 | Smitt | ............................ | 358/474 |
| 6,365,886 B1 * | 4/2002 | Ang et al. | .................. | 250/208.1 |
| 7,190,486 B2 * | 3/2007 | Tabata et al. | ................... | 358/1.9 |
| 7,471,426 B2 * | 12/2008 | Ide et al. | ....................... | 358/474 |
| 7,714,901 B2 * | 5/2010 | Li | ............................. | 348/222.1 |
| 2001/0019619 A1 * | 9/2001 | Watanabe et al. | ............. | 382/101 |
| 2002/0054329 A1 * | 5/2002 | Hiraoka | ........................ | 358/1.15 |
| 2003/0038983 A1 * | 2/2003 | Tanabe et al. | .................. | 358/461 |
| 2003/0062922 A1 | 4/2003 | Douglass et al. | | |
| 2003/0142376 A1 * | 7/2003 | Tabata et al. | ................... | 358/518 |
| 2004/0057079 A1 * | 3/2004 | Ohsawa | ......................... | 358/2.1 |
| 2005/0018267 A1 * | 1/2005 | Ando | ............................ | 359/198 |

(Continued)

FOREIGN PATENT DOCUMENTS

JP          02-189089 A          7/1990

(Continued)

*Primary Examiner* — Madeleine A Nguyen
(74) *Attorney, Agent, or Firm* — Birch, Stewart, Kolasch & Birch, LLP

(57) ABSTRACT

A scanner and a method of scanning an image on an original includes an optical sensor having sensor elements for each of three basic colors that is used to generate pixel values of the scanned image. Each pixel value represents an optical density of a pixel of the image and is generated mainly on the basis of a signal of only one of the sensor elements. Each of the sensor elements for each of the basic colors is used to generate pixel values representing substantially different parts of the image.

18 Claims, 3 Drawing Sheets

U.S. PATENT DOCUMENTS

| | | | |
|---|---|---|---|
| 2005/0078867 A1* | 4/2005 | Kanno | 382/163 |
| 2005/0078886 A1* | 4/2005 | Yushiya et al. | 382/312 |
| 2005/0185199 A1* | 8/2005 | Ono | 358/1.1 |
| 2005/0206973 A1* | 9/2005 | Shoji et al. | 358/500 |
| 2006/0050330 A1* | 3/2006 | Tanimoto et al. | 358/474 |
| 2006/0077484 A1* | 4/2006 | Toyoda et al. | 358/498 |
| 2006/0203113 A1* | 9/2006 | Wada et al. | 348/302 |
| 2006/0209360 A1* | 9/2006 | Sakakibara | 358/474 |
| 2006/0256398 A1* | 11/2006 | Ishimaru et al. | 358/461 |
| 2009/0097078 A1* | 4/2009 | Ide et al. | 358/474 |
| 2009/0122369 A1* | 5/2009 | Minamino | 358/505 |

FOREIGN PATENT DOCUMENTS

| | | |
|---|---|---|
| JP | 09-074464 A | 3/1997 |
| JP | 2003-078771 A | 3/2003 |

* cited by examiner

SCANNER AND METHOD OF SCANNING

CROSS-REFERENCE TO RELATED APPLICATIONS

This application is a Continuation of International Application No. PCT/EP2005/012882, and claims priority under 35 U.S.C. §120, the entirety of which is expressly incorporated herein by reference.

BACKGROUND OF THE INVENTION

1. Field of the Invention

The present invention relates to a scanner and a method of scanning an image on an original, wherein an optical sensor having sensor elements for each of three basic colors is used to generate pixel values of the scanned image, each pixel value representing an optical density of a pixel of the image. Thus, a monochrome, i.e. a grey scale or black and white (B/W) image of the original is obtained using a color scanner.

2. Description of Background Art

In reduction type scanners, an optical sensor with one or more linear CCD (charge coupled device) arrays and a lens are arranged to focus lines of an original onto the CCD line arrays. The scanner usually has one light source emitting white light.

In a color scanner, for example, there are at least three CCD line arrays having color filters for red, green, and blue light, respectively, thus forming sensor elements for the basic colors of red, green, and blue light. Typically, the sensor elements for different colors have different light sensitivities. When a grey scale image is to be obtained from a color original, the original is scanned, and the signals from the sensor elements for red, green, and blue light are mathematically mixed in order to calculate the grey intensity from the RGB values of each pixel of the image. Hence, the grey level of a pixel is a weighted average of the RGB levels, wherein the weight factors are defined such that the hue and saturation information is eliminated. This will be called the conventional scan mode in the following.

The scan speed of a reduction type scanner is limited by the maximal clock speed of the CCD. This is a profound limitation in view of a demand for high scan resolutions. In order to obtain a higher scan speed, it is known to additionally provide a panchromatic sensor element for B/W data. Thus, the grey intensity of a color original can be scanned using only the panchromatic sensor element. However, providing an extra panchromatic sensor element is costly.

Moreover, a B/W original could be read using only a single sensor element of a color sensor, e.g. the sensor element for green light, when the sensor element for green light has the highest sensitivity.

U.S. Pat. No. 5,923,447 discloses a method of reading a color original to obtain a B/W image using at least two of the R, G, and B light receiving elements of an optical sensor. A B/W image could not be received by using only the sensor element for, e.g. green light, because a green part of the original would then be recognized as white. By using adding means to add the signals output from the at least two of the R, G, and B light receiving elements for each pixel, a black-white judging means is enabled to correctly judge, based on the added result, whether the pixel is to be represented as black or white. However, this method is not applicable when a grey scale image is to be obtained from a color original.

SUMMARY OF THE INVENTION

It is an object of the present invention to provide a scanner and a method of scanning wherein a grey scale or B/W image can be obtained from a grey scale or B/W original and/or from a color original with high speed.

According to the present invention, this object is achieved by a method as described above wherein each pixel value is generated mainly on the basis of a signal of only one of the sensor elements, and each of the sensor elements for each of the basic colors is used to generate pixel values representing substantially different parts of the image. Furthermore, this object is achieved by a scanner adapted to operate according to the method described. For example, the basic colors are red, green, and blue.

Thus, the amount of pixels to be scanned is divided among the sensor elements for the different basic colors. Thereby, the scan speed can be increased up to three times compared to the conventional scan mode, wherein each pixel of the original is scanned by three sensor elements. Thus, a color scanner can be used with a high scan speed when only a grey scale or B/W image is needed.

For example, the sensor elements are arranged in parallel at slightly different positions along a transport direction, i.e. a direction of relative movement of the original and the optical sensor, so that different lines of the original are each focused on different sensor elements. For example, the timing of the scanning and the arrangement of the sensor elements is such that each line of the original is mainly scanned only by sensor elements for either red, green, or blue light.

Preferably, sensor elements for all of the basic colors, e.g. red, green, and blue, operate simultaneously. For example, operation cycles of the sensor elements are synchronized such that pixels at three different positions along a scan direction are simultaneously read by the sensor elements for each of three basic colors.

Preferably, during a relative movement of the original and the optical sensor, each pixel of the image is successively imaged onto the sensor elements for each of the basic colors, and sample timings of the sensor elements are controlled such that the sensor elements are mainly sensitive to different pixels. Thus, for each scanned pixel, the pixel value generated is mainly based on the signal of only one of the sensor elements.

In the examples given below, the basic colors are red, green, and blue, and a pixel of the image which has a pixel value that is based mainly on a sensor element for red light will be called a "red" pixel, although the pixel values indicate only a grey scale value. The terms "green" pixels and "blue" pixels will be used analogously.

Preferably, "red", "green", and "blue" pixels are arranged in an interleaved pattern. One example of an interleaved pattern could be symbolized as "RGBRGBRGB . . . ".

In one embodiment, the signals of the sensor elements are corrected by factors accounting for different light sensitivities of the sensor elements for the different basic colors. For example, when a homogeneously white area of the original is scanned, the signal from the sensor element for blue light may differ from the signal from the sensor element for green light. By correcting the signals, consistent pixel values are achieved.

Thus, when a non-color original, i.e. a grey scale or B/W original is scanned, the factors are adjusted such that a uniformly grey area of the original gives the same pixel values for pixels that are scanned by the different sensor elements. Thereby, a pixel of the original has to be scanned by only one of the sensor elements to obtain a density value. Because at least three sensor elements for the three basic colors may be used simultaneously, the scan speed may be up to three times as high as in a conventional B/W scan mode, wherein each pixel is read by three sensor elements, e.g. three line arrays of CCDs.

The method of correcting the signals of the sensor elements by factors accounting for different light sensitivities of the sensor elements in general does not lead to satisfying results in the case of color originals. For example, artefacts result from the fact that the pixel values generated by the different sensor elements for each of three basic colors do not only depend on the optical density level of the scanned pixels, but also on the different colors. For example, when one of the basic colors is blue and a uniformly blue original is scanned, the sensor elements for blue light will give signals corresponding to a certain grey scale value of the pixels whereas the sensor elements for, for example, red and green light would recognize the pixels as being almost black. When the sensor elements and the operation cycles of the sensor elements are arranged such that there is an interleaved pattern of "red", "green", and "blue" pixels in the image which is repeated along a scan direction with a certain repeat length, the artefacts show a spatial frequency that corresponds to the repeat length.

According to a further development of the present invention, the mentioned problem of frequency artefacts is solved by correcting the pixel values by a mathematical filter. When the sensor elements and the operation cycles of the sensor elements are arranged such that there is an interleaved pattern of "red", "green", and "blue" pixels in the image that is repeated along a scan direction, a filter removes artefacts having a spatial frequency of ⅓ the pixel frequency in the scan direction.

Preferably, the pixels to be detected by different sensor elements are interleaved with a minimal repeat length along a scan direction, and the filter is adapted to reduce the occurrence of a spatial frequency in the image corresponding to the repeat length. In other words, for each pixel of the image there is assigned a sensor element, the signal of which the pixel value of the pixel is mainly based on (i.e. there are "red", "green", and "blue" pixels), and the sensor element assignments are repeated with a minimal repeat length along a scan direction of the image (i.e., "red", "green", and "blue" pixels are arranged in a regular pattern with a pattern repeat length in the scan direction), and the filter is adapted to reduce an occurrence of a spatial frequency in the image corresponding to said repeat length and scan direction.

The scan direction is, for example, the transport direction or, alternatively, a line direction that is perpendicular to the transport direction.

Thereby, frequency artefacts in the scan direction are corrected. In the same manner, frequency artefacts in more than one direction may be corrected by filters. The correction of frequency artefacts for two different directions may be performed by a two-dimensional filter. For example, when a high line resolution of a scanner is achieved by arranging for each of the three basic colors one CCD line array for odd pixels and one CCD line array for even pixels within a line of the image perpendicular to the transport direction or sub scan direction, artefacts with a spatial frequency of ½ the pixel frequency along the line direction are suppressed by the filter.

The required amount of suppression at the artefact frequencies depends on the required number of grey levels that should be distinguished and also on the color richness and/or variation of the color original.

According to a further development of the method, the described mathematical filter is used to correct the pixel values depending on a degree of an occurrence of a spatial frequency in the image corresponding to said repeat length and scan direction. For example, the scanning method comprises a step of deciding on the basis of a degree of an occurrence of a spatial frequency in the image corresponding to said repeat length whether or not the filter is used.

Thus, the method provides an adaptive compensation of the frequency artefacts. In the case of a color original, a comparatively high degree of frequency artefacts will be present in the image, so that the mathematical filter is used to suppress these frequency artefacts. In the case of a grey scale or B/W original, a comparatively low level of frequency artefacts will be present in the image. Thus, less or even no filtering is required. In other words, filter parameters may be varied depending on a degree of an occurrence of a spatial frequency in the image corresponding to a pattern repeat length, or it may be decided depending on the degree of the occurrence of the spatial frequency whether the filter will be used or not. Thereby, the filtering is adjusted automatically by recognizing if the original is a color original or a grey scale or B/W original. Thus, a user of a scanner does not have to indicate whether the original is a color original or not.

Alternatively, the same filter may be used for color originals and B/W originals, since in the case of a non-color original, the filter has only a small effect on the scanned image.

Because, according to the present invention, the scan speed may be as high as three times the conventional scan speed, each sensor element passes over up to three pixels during one operation cycle of the sensor element. Therefore, a certain movement unsharpness (blur) may occur.

According to a preferred embodiment of the scanner of the present invention, the sensor elements operate in periodic operation cycles and the scanner further comprises a mechanism for limiting a light integration time of the sensor elements within each operation cycle of the sensor elements to approximately a time of not more than two thirds of the operation cycle time. Preferably, the light integration is limited to a time that corresponds to approximately the size of a pixel in the direction of relative movement of the original and the optical sensor. Thereby, the movement unsharpness can be reduced.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
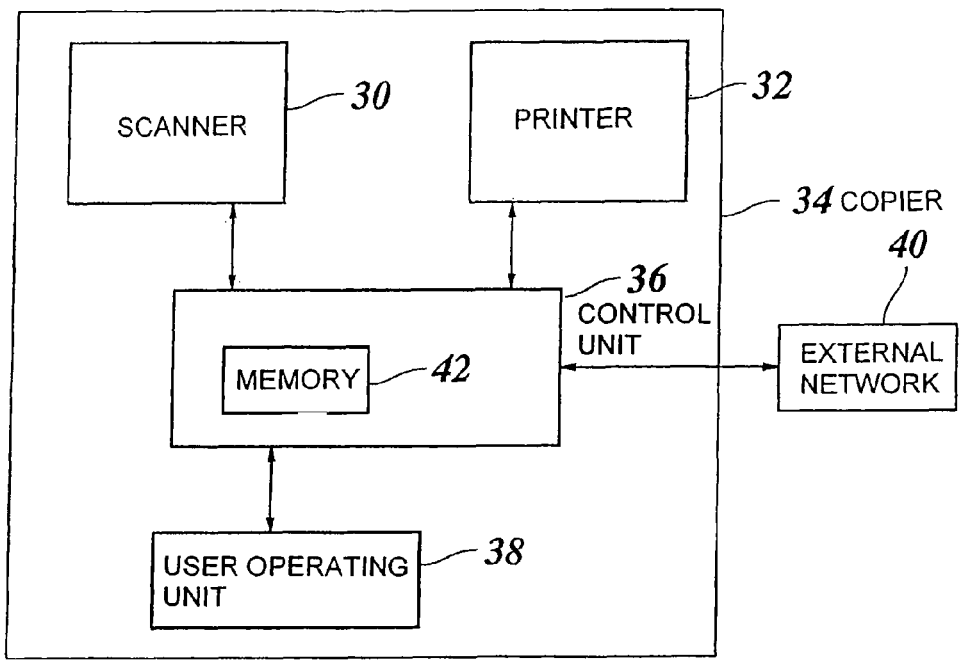
FIG. 1 schematically shows components of a copier including a scanner and a printer.

The present invention will now be described with reference to the accompanying drawings, wherein the same reference numerals have been used to identify the same or similar elements throughout the several views.

FIG. 1 shows a scanner 30 according to the present invention which, together with a printer 32, forms a copier 34. A control unit 36 controls the scanner 30 and the printer 32 and is connected to a user operating unit 38 and an external network 40. When the scanner 30 reads an original, the scanned image may be transferred to a memory 42 of the control unit 36 and printed by the printer 32, or it may be transferred via the external network 40 to, for example, a PC.

Figure 2:
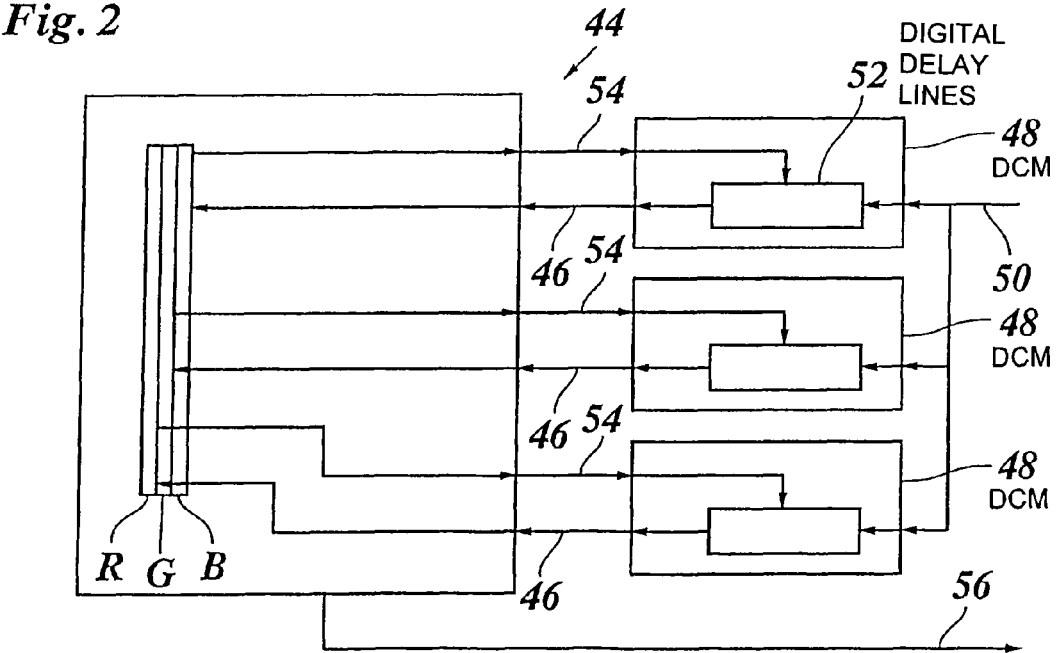
FIG. 2 schematically shows an optical sensor of the scanner.

FIG. 2 shows an optical sensor 44 of the scanner 30. The sensor 44 has three parallel CCD line arrays of the sensor elements R, G, and B. Clock signals 46 for the CCDs are generated by digital clock managers (DCMs) 48 from a base clock signal 50. The clock signals 46 are derived from the base clock signal 50 at specified phase relations using digital delay lines 52 of the DCMs 48. Feed back signals 54 are obtained from drive buffers of the CCDs and are fed to the DCMs 48 to compensate for varying delays or jitter generated in the circuits. Thus, the DCMs 48 provide for a high stability of the clock signals 46. The pixel values detected by the scanner are output on a signal line 56.

Because the DCMs 48 are used to generate the clock signals 46, the base clock signal 50 may have the same frequency as the clock signals 46. In conventional optical sensors using CCDs, the clock signals are usually generated using a higher base frequency that is converted by counters and dividers to generate the different clock frequencies at the needed phase relations. This leads to problems in high-speed scanning because of the extremely high base frequencies that would be required. Moreover, problems of stability and reproducibility of the clock signals arise. The use of digital clock managers according to the present invention has the advantages that the needed phase relations can be achieved without needing a higher base frequency, and that the high stability and reproducibility of the clock signals is achieved by providing a feed back signal from the drive buffers of the CCDs to the DCMs. For example, the DCMs 48 may be included in field programmable gate arrays (FPGA) which are produced, for example, by Xilinx, Inc. and which are described in U.S. Application Publication No. 2003/0062922 A1.

Of course, the described configuration for generating clock signals may be applied in any device that uses CCD technology.

Figure 3:
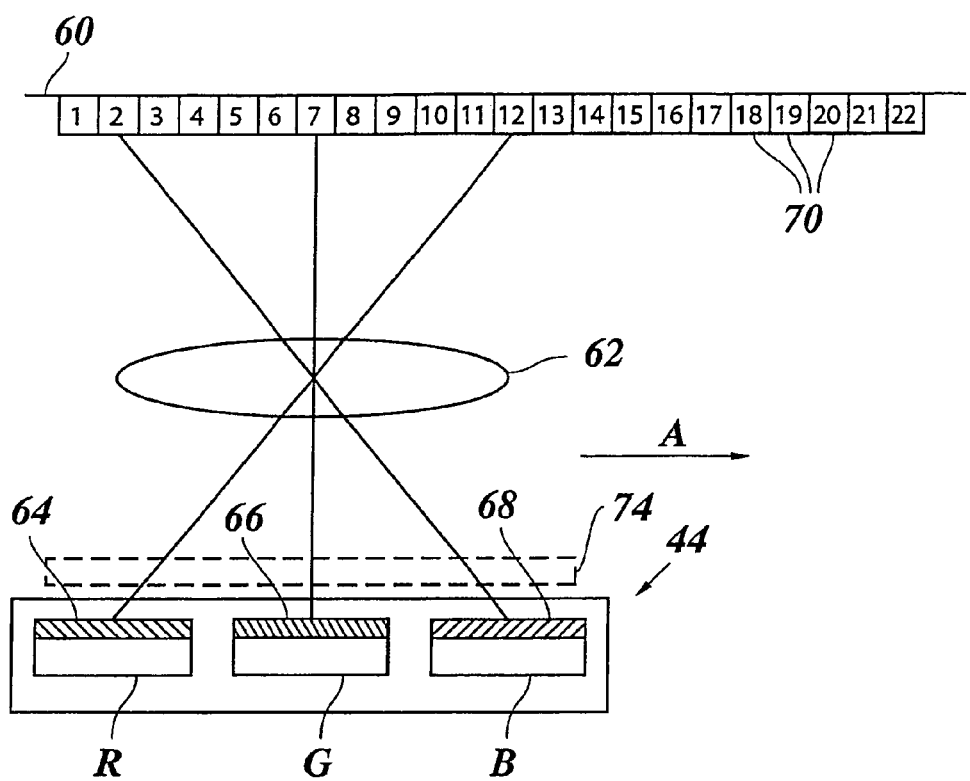
FIG. 3 schematically shows three sensor elements of the optical sensor.

As shown in FIG. 3, the optical sensor is of the reduction type. Lines of an original 60 that extend perpendicular to the plane of the drawing of FIG. 3 are projected by a lens device 62 onto the arrays of sensor elements R, G, B, which also extend perpendicular to the plane of the drawing of FIG. 3. White light from a light source illuminates the original in a manner known in the art. The sensor element R has a color filter 64 for red light. The sensor elements G and B are equipped with color filters 66 and 68 for green and blue light, respectively. The arrays of sensor elements R, G, B are arranged in parallel, and different lines of the original 60 are focused on different sensor elements.

The scanning procedure will now be described in conjunction with FIGS. 4a to 4g. During the scanning process, the optical sensor 44 is moved relative to the original 60 in a scan direction A. FIG. 3 shows a row of pixels 70 of the original 60 belonging to image lines 1 to 22. In FIGS. 4a to 4g, the corresponding pixels of one row of the scanned image are shown for different clock periods of the sensor elements R, G, B.

The operation cycles of the CCDs are synchronized. In a first clock period, the sensor element B passes over the image lines 1 to 3, the sensor element G passes over the pixel lines 6 to 8, and the sensor element R passes over the image lines 11 to 13. By providing the appropriate clock signals to the CCDs of the optical sensor 44, the light integration time of the sensor elements within each operation cycle is limited to approximately one third of the cycle period. The integration or sample periods are timed such that the sensor element B is mainly sensitive to pixels in line 2. This is indicated by a "B" at the position of pixel 2 in FIG. 4a. Correspondingly, the sensor element G substantially reads the pixels in line 7, and the sensor element R substantially reads the pixels in line 12.

Figure 4A:
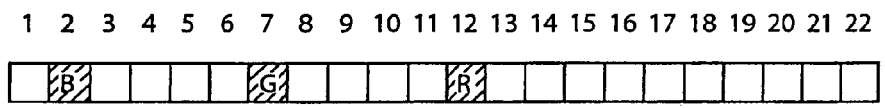
FIGS. 4a to 4g illustrate the process of scanning a row of pixels with the sensor elements of FIG. 3.
Figure 4B:
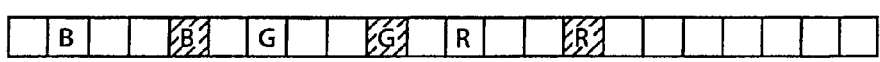
Figure 4C:
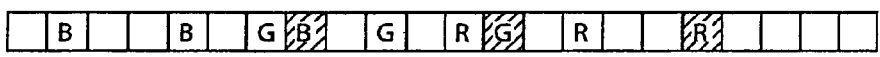
Figure 4D:
Figure 4E:
Figure 4F:
Figure 4G:
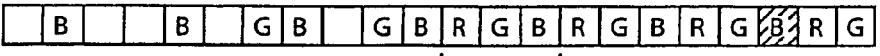

During the second clock period, the sensor elements R, G, B pass over the image lines 14 to 16, 9 to 11, and 4 to 6, respectively, and pixels of lines 5, 10, and 15 are read as indicated in FIG. 4b.

FIGS. 4c to 4g respectively show clock periods 3 to 7, wherein the newly read pixels are indicated by hatching.

Each pixel is thus read by only one of the sensor elements R, G, B. Therefore, the scan speed may be up to three times the conventional scan speed. For example, the pixel value of pixel 12 is based on the signal of the sensor element R, the pixel value of the pixel 13 is based on a signal of the sensor element G, and the pixel value of the pixel 14 is based on the signal of the sensor element B. In the following, the pixels and the pixel values will be called "R" pixels, "G" pixels and "B" pixels, depending on the sensor element which has read them. As can be seen in the right half of FIG. 4g, each row of the image shows a pattern of one "R" pixel, one "G" pixel, and one "B" pixel which is repeated with a repeat length L corresponding to the length of three pixels.

Figure 5:
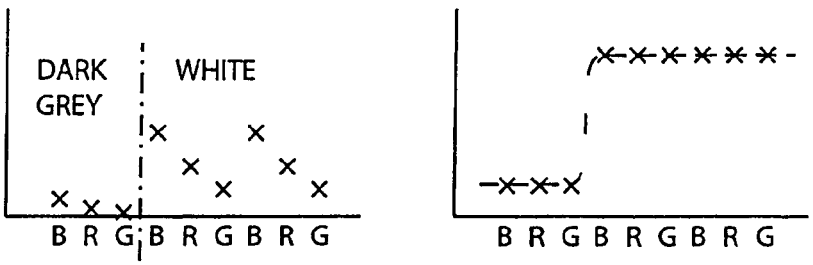
FIGS. 5 to 7 show diagrams illustrating the correction of pixel values.
Figure 6:
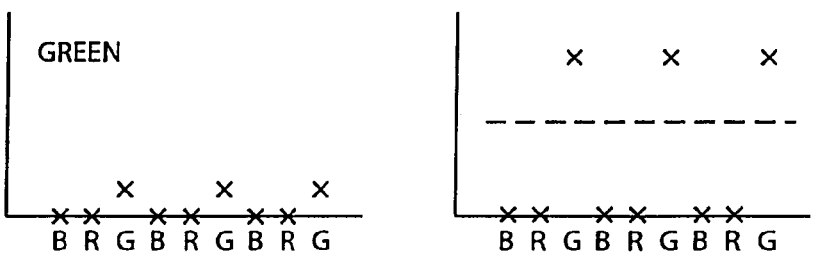
Figure 7:
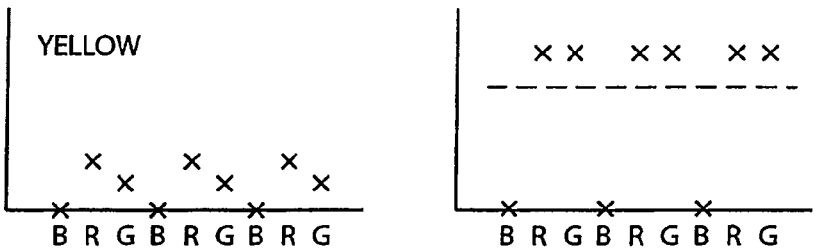

In FIGS. 5, 6, and 7, pixel values of nine pixels of a row of the image are indicated on the right hand side of each figure, and the corresponding signals from the sensor elements are indicated on the left hand side of each figure.

A method of processing the pixel values will now be described with reference to FIGS. 5 to 8.

In a first step S1 (FIG. 8) the original is scanned as described in conjunction with FIGS. 3 and 4. FIG. 5 shows signals from sensor elements B, R, and G acquired at a dark grey area of the original and at a white area of the original. The signals are corrected by factors accounting for the different light sensitivities of the sensor elements in step S2. The resulting pixel values are indicated on the right hand side of FIG. 5. Regardless of which sensor element was used, the pixel values representing the white area of the original are the same, and the pixel values representing the dark grey area of the original have a lower value, which is also independent of the sensor element it is derived from.

In FIG. 6, the signals from the sensor elements and the derived pixel values after correction by the factors are indicated for a green area of the original. As can be seen, the sensor elements R and B do not recognize green light, so that the pixel values of the "B" pixels and the "R" pixels are much lower than that of the "G" pixels. These artefacts would thus yield an alternating pattern of black and white lines in the image instead of a uniform area corresponding to the grey scale value of the green area of the original.

FIG. 7 shows a similar effect for a yellow area of the original, where the sensor elements R and G yield a high pixel value of the "R" and "G" pixels, while the signals from the sensor element B would give dark pixels.

These artefacts are recognized in step S3. The artefact recognition is, for example, based on the output of a mathematical filter that is sensitive to a spatial frequency corresponding to the repeat length L in the scan direction A of the image.

As can be seen in FIG. 5, these frequency artefacts do not appear in grey scale or black and white originals. As can be seen in FIGS. 6 and 7, however, these frequency artefacts generally occur in colored areas of a color original. Therefore, in step S3 it is decided whether the original, or at least a certain area of the original, is colored or grey scale. In case frequency artefacts are recognized to be above a certain level, the pixel values will be corrected using a mathematical filter in step S4. The filter is adapted to reduce the occurrence of a spatial frequency in the image corresponding to the repeat length L in the scan direction A. Although the filter operates on the pixel values, each pixel value is still mainly based on a signal of only one of the sensor elements R, G, B for red, green, and blue light. A very simple example of such a filter would be taking an average of three neighboring pixel values. However, more complex filter algorithms may be used.

By correcting the pixel values using the mathematical filter, a grey scale image is obtained in step S5 the pixel values of which are indicated as dashed lines in FIGS. 5, 6, and 7, respectively. As can be seen, the dark grey area, the green area, and yellow area of the original yield a grey scale value of the pixels of the image, which is independent of which sensor element the pixel value is derived from.

When in step S3 it is decided that frequency artefacts are not present, a grey scale image is obtained without using the filter. Thereby, grey scale originals can be scanned with the highest possible resolution.

Figure 8:
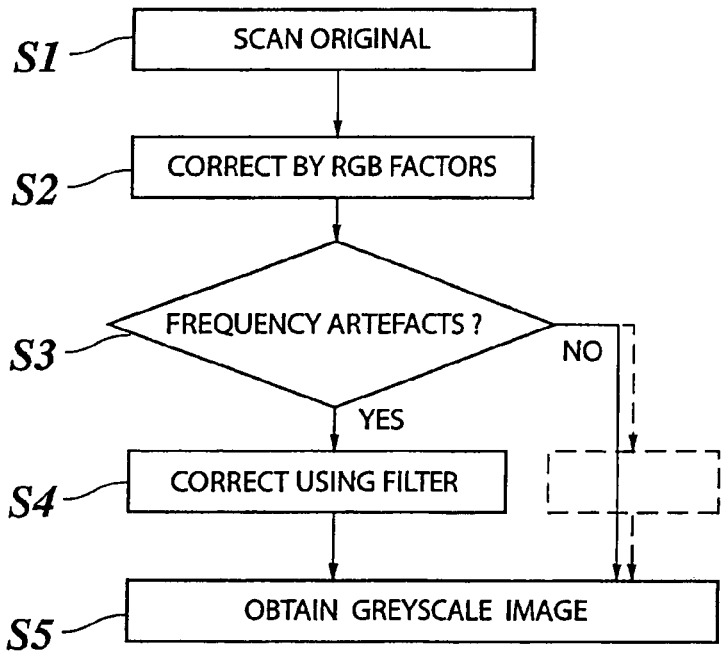
FIG. 8 schematically shows the method of scanning according to the invention.

Alternatively, as indicated by dashed lines in FIG. 8, a filter with different filter parameters, or a different filter, may be applied to the pixel values also in this case. However, when less frequency artefacts are present, less filtering is required.

As an alternative to the method shown in FIG. 8, the correction for the RGB factors (step S2) may be included in the filters of step S4. In this case, the filter which is used in step 3 to determine with the frequency artefacts are present above a certain level has to be adapted accordingly.

As an alternative to the described method, a light integration time of the sensor element within each operation cycle may be reduced by providing a shutter 74 indicated in dashed lines in FIG. 3. For example, the shutter shuts off the light path to the sensor elements while the sensor element B is focused on lines 1 and 3 in FIG. 3, so that the sensor element B receives the light only from the line 2 while passing over lines 1 to 3.

When, depending on the number and arrangement of CCD line arrays of the optical sensor, artefacts also appear within a line of the image, i.e., perpendicular to the rows shown in FIGS. 4a to 4g, the filter may be a two-dimensional filter for suppressing frequency artefacts along two independent scan directions of the image. This may, for instance, be the case when the optical sensors have different CCD line arrays for odd and even pixels in the line direction for each color. In this case, a frequency artefact corresponding to the width of two pixels will be present in the sensor signals for each pixel line and will be suppressed by the filter. Alternatively, two filters may be used consecutively.

According to the invention, it is possible to scan both grey scale originals as well as colored originals at high speed with a singe optical sensor having sensor elements for three basic colors and without prior knowledge of the type of the original.

Instead of increasing the scan speed to three times the conventional scan speed, the scan speed could be increased to a medium level while at the same time the resolution along the transport direction is also increased. Thereby, because of the higher resolution, an unsharpness effect of the filtering and, if present at all, a movement unsharpness is reduced as compared to the described example, while the overall scan time is still reduced compared to scanning with the conventional scan speed. Furthermore, instead of increasing the scan speed, the scan resolution could be increased to up to three times the scan resolution of a conventional scan mode.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of scanning an image on an original, comprising the steps of:
    using an optical sensor comprising three line arrays of sensor elements for each of three basic colors to generate pixel values of the scanned image, the three line arrays being arranged in parrallel at slightly different positions along a direction of relative movement of the original and the optical sensor, wherein each pixel value represents an optical density of a pixel of the image;
    scanning each pixel by using a corresponding one of the sensor elements of only one of the three line arrays without using the rest of the sensor elements;
    generating each pixel value mainly on the basis of a signal of the corresponding one of the sensor elements of the only one of the three line arrays; and
    using each of the sensor elements of each of the three line arrays for each of the basic colors to generate pixel values representing substantially different parts of the image.

2. The method according to claim 1, further comprising the step of operating the sensor elements of the three line arrays for all of the basic colors simultaneously.

3. The method according to claim 2, further comprising the steps of:
    successively imaging each pixel of the image onto the sensor elements of the three line arrays for each of the basic colors during a relative movement of the original and the optical sensor; and
    controlling sample timings of the sensor elements of the three line arrays such that the sensor elements are mainly sensitive to different pixels.

4. The method according to claim 1, further comprising the steps of:
    successively imaging each pixel of the image onto the sensor elements of the three line arrays for each of the basic colors during a relative movement of the original and the optical sensor; and
    controlling sample timings of the sensor elements of the three line arrays such that the sensor elements of the three line arrays are mainly sensitive to different pixels.

5. The method according to claim 1, further comprising the step of correcting the signals of the sensor elements of the three line arrays by factors accounting for different light sensitivities of the sensor elements of the three line arrays for the different basic colors.

6. The method according to claim 1, further comprising the step of correcting the pixel values representing the image with a mathematical filter.

7. The method according to claim 6, further comprising the step of interleaving the pixels to be detected by different sensor elements of the three line arrays with a minimal repeat length along a scan direction, wherein the mathematical filter is adapted to reduce an occurrence of a spatial frequency in the image corresponding to said repeat length.

8. The method according to claim 6, further comprising the step of deciding, on the basis of a degree of an occurrence of a spatial frequency in the image corresponding to said repeat length, whether or not the mathematical filter is used.

9. The method according to claim 7, further comprising the step of deciding, on the basis of a degree of an occurrence of a spatial frequency in the image corresponding to said repeat length, whether or not the mathematical filter is used.

10. A scanner, comprising:
- an optical sensor having three line arrays of sensor elements for each of three basic colors, the three line arrays of sensor elements being arranged in parallel at slightly different positions along a direction of relative movement of the original and the optical sensor, the scanner being configured to perform a method of scanning an image on an original, said method comprising the steps of:
- using the optical sensor comprising the three line arrays of sensor elements for each of the three basic colors to generate pixel values of the scanned image, wherein each pixel value represents an optical density of a pixel of the image;
- scanning each pixel by using a corresponding one of the sensor elements of only one of the three line arrays without using the rest of the sensor elements;
- generating each pixel value mainly on the basis of a signal of the corresponding one of the sensor elements of only one of the three line arrays; and
- using each of the sensor elements of the three line arrays for each of the basic colors to generate pixel values representing substantially different parts of the image.

11. The scanner according to claim 10, wherein the three line arrays of the sensor elements operate periodically with a certain cycle time and wherein the scanner further comprises a mechanism that limits a light integration time of the three line arrays of the sensor elements within each cycle to approximately a time of not more than two thirds of the cycle time.

12. The scanner according to claim 10, wherein the three line arrays of the sensor elements for all of the basic colors operate simultaneously.

13. The scanner according to claim 10, wherein during a relative movement of the original and the optical sensor, each pixel of the image is successively imaged onto the three line arrays of the sensor elements for each of the basic colors, and sample timings of the three line arrays of the sensor elements are controlled such that the three lien arrays of the sensor elements are mainly sensitive to different pixels.

14. The scanner according to claim 10, wherein the signals of the sensor elements of the three line arrays are corrected by factors accounting for different light sensitivities of the sensor elements of the three line arrays for the different basic colors.

15. The scanner according to claim 10, wherein the pixel values representing the image are corrected with a mathematical filter.

16. The scanner according to claim 15, wherein the pixels to be detected by sensor elements of a different one of the three line arrays are interleaved with a minimal repeat length along a scan direction, and wherein the mathematical filter is adapted to reduce an occurrence of a spatial frequency in the image corresponding to said repeat length.

17. The scanner according to claim 16, wherein it is decided whether or not the mathematical filter is used, on the basis of a degree of an occurrence of a spatial frequency in the image corresponding to said repeat length.

18. A scanner, comprising:
- an optical sensor having three line arrays of sensor elements for each of three basic colors, the scanner being configured to perform a method of scanning an image on an original, said method comprising the steps of:
- using the optical sensor comprising the three line arrays of sensor elements for each of the three basic colors to generate pixel values of the scanned image, wherein each pixel value represents an optical density of a pixel of the image;
- generating each pixel value mainly on the basis of a signal of one of the sensor elements of only one of the three line arrays; and
- using each of the three line arrays of the sensor elements for each of the basic colors to generate pixel values representing substantially different parts of the image,
- wherein the three line arrays of the sensor elements operate periodically with a certain cycle time and wherein the scanner further comprises a mechanism that limits a light integration time of the sensor elements within each cycle to approximately a time of not more than two thirds of the cycle time.

* * * * *